United States Patent [19]

Hines

[11] 4,157,734

[45] Jun. 12, 1979

[54] SOIL AERATING DEVICE

[75] Inventor: Charles E. Hines, Lincoln, Nebr.

[73] Assignee: Outboard Marine Corporation, Waukegan, Ill.

[21] Appl. No.: 874,504

[22] Filed: Feb. 2, 1978

[51] Int. Cl.² .............................................. A01B 45/02
[52] U.S. Cl. ........................................ 172/22; 366/188
[58] Field of Search ................................... 172/21, 22; 366/187–189

[56] References Cited

U.S. PATENT DOCUMENTS

| 3,264,877 | 8/1966 | Boxrud | 172/22 X |
| 3,331,249 | 7/1967 | Boxrud | 172/22 X |
| 3,643,746 | 2/1972 | Deddes | 172/22 X |

FOREIGN PATENT DOCUMENTS 1329058 4/1963 France ...................................... 366/188

Primary Examiner—Paul E. Shapiro
Attorney, Agent, or Firm—Michael, Best & Friedrich

[57] ABSTRACT

Disclosed herein is a soil aerating device including a cylindrical drum having an outer peripheral wall and rotatably mounted on a frame for rolling travel over the surface of the ground or turf to be aerated and a plurality of core-forming elements or tines mounted on the exterior of the peripheral wall for removing plugs or cores of earth and depositing same in the interior of the drum as the drum is rolled over the surface of the ground or turf. A portion of the peripheral wall is formed by a trap door hingedly mounted on the drum and releasably held in the closed position by a pair of latch arms, each including a notch for receiving a respective locking pin on the trap door and carried on a shaft member mounted on the drum for rotation about an axis parallel to the drum axis. A drive member mounted on the frame for rotation about a fixed axis and for axial movement relative to the drum between a retracted position and an extended position to drivingly engage one end of the shaft member is operable for selectively preventing rotation of the drum and for selectively moving the latch arms to an unlatching position to permit opening of the trap door.

12 Claims, 5 Drawing Figures

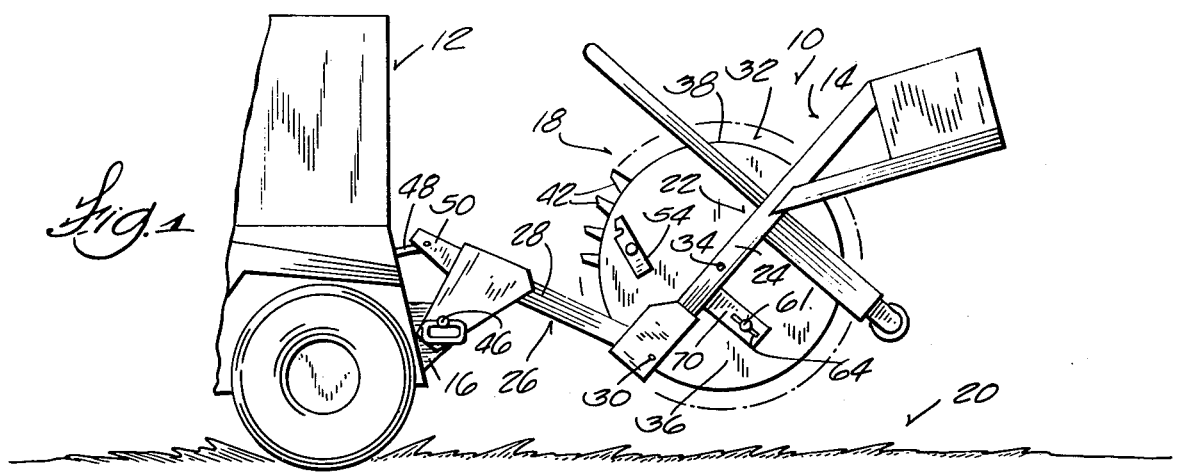
Fig. 1
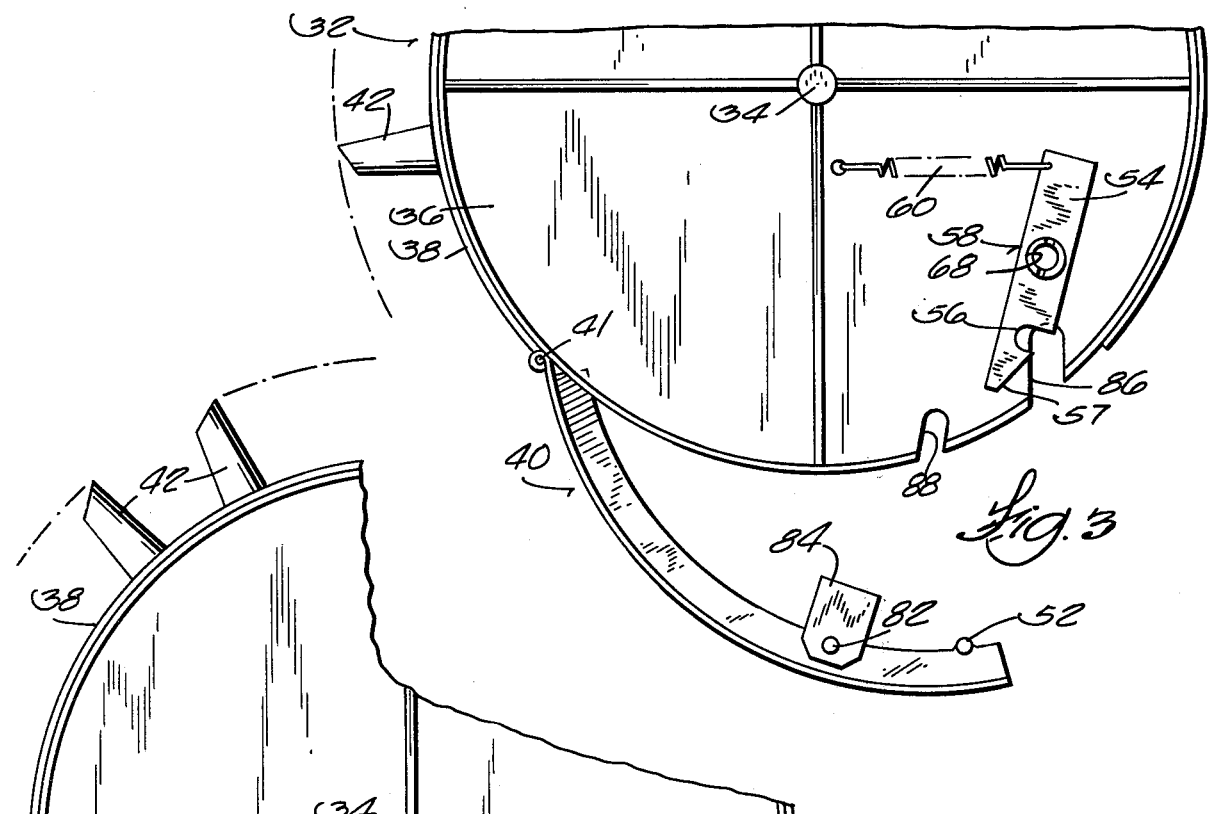
Fig. 3
Fig. 2

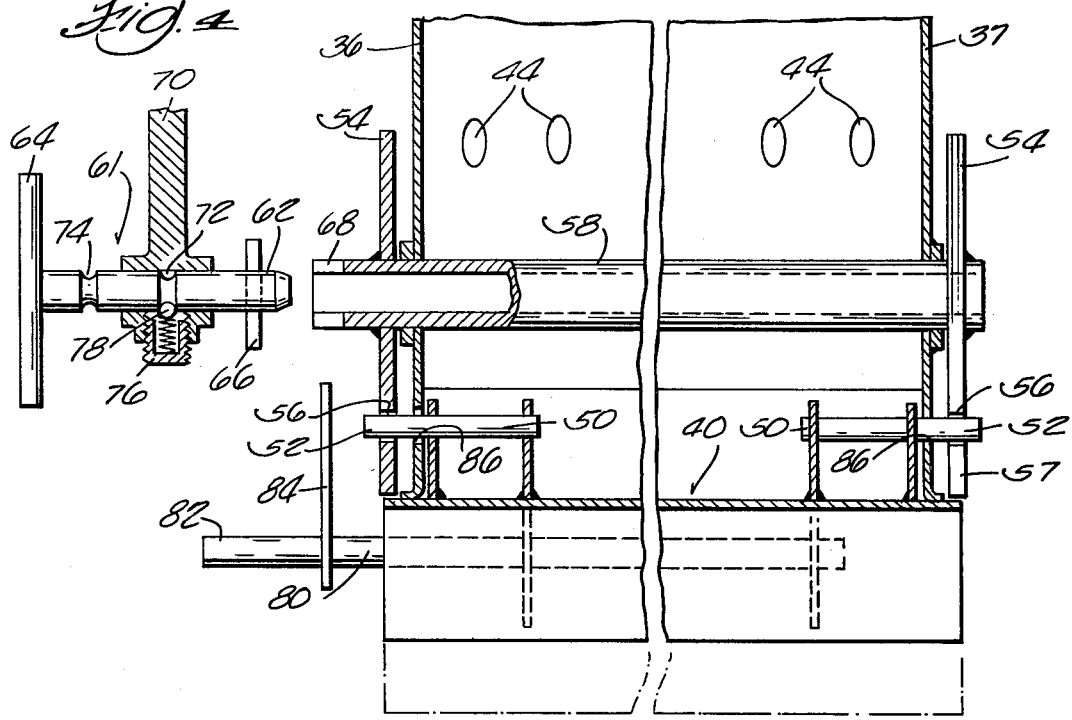
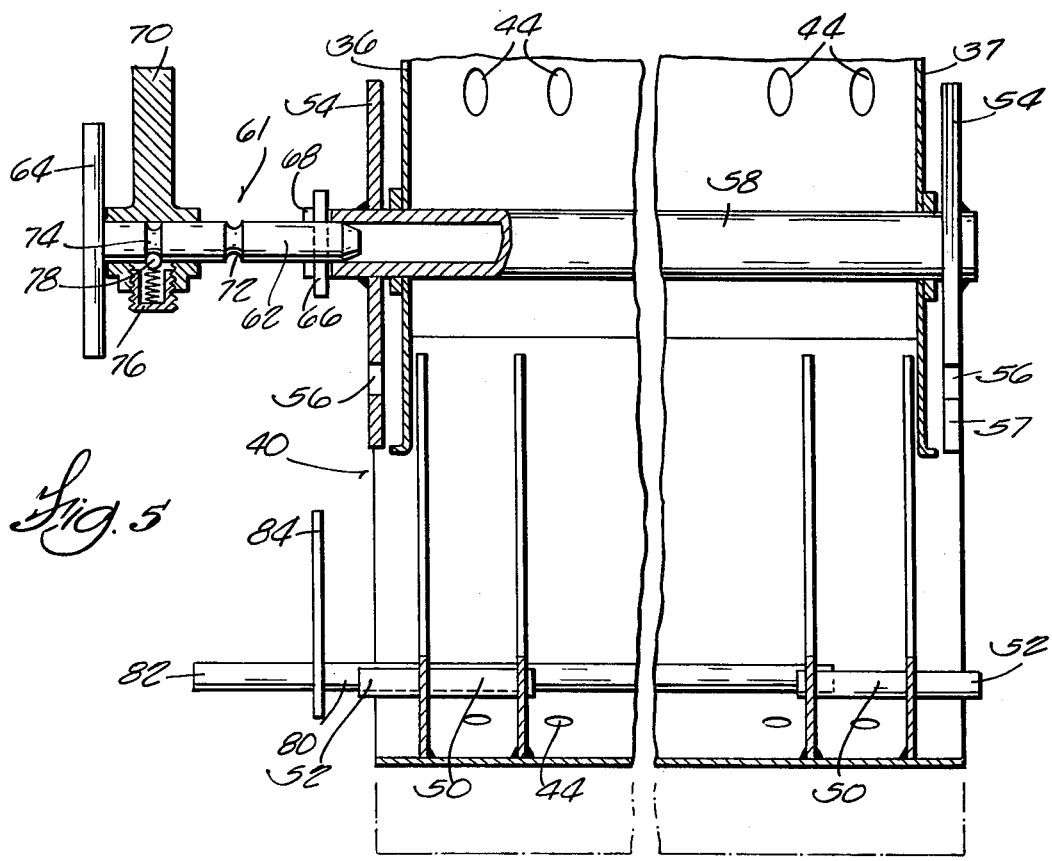

SOIL AERATING DEVICE

BACKGROUND OF THE INVENTION

The invention relates to soil aerating devices and, more particularly, to soil aerating devices including one or more rotatable members or cylindrical drums carrying core-forming elements or tines.

Soil aerating devices are commonly used for aerating golf course greens, fairways, and tees, playing fields, lawns and the like. One type of such devices includes one or more rotatable members or cylindrical drums carrying a plurality of core-forming elements or tines which penetrate through the turf to remove plugs or cores of grass and soil as the drum is rolled over the surface to be aerated.

It is often desirable to collect these cores for disposal at another location. This can be accomplished by arranging the tines and the drum so that the cores are deposited and collected in the interior of the drum, in which case the drum usually is provided with some sort of access door to facilitate removal of the cores. Such a door can form part of the peripheral wall of the drum and be arranged to act as a trap door so that the cores can be conveniently dumped from the drum. The dumping operation can be expedited by providing a conveniently accessible means for locking the drum against rotation in the desired rotational position for opening the door to dump the cores and for selectively moving a latch mechanism releasably holding the door in the closed position to an unlatching position.

Examples of prior art constructions for soil aerating devices of this general type are disclosed in the following U.S. Pat. Nos.

| Dedoes | 3,643,746 | issued February 22, 1972 |
| Dedoes | 3,756,203 | issued September 4, 1973 |
| Angeski | 3,881,553 | issued May 6, 1975 |

Attention is directed to Boxrud U.S. Pat. No. 3,264,877, issued Aug. 9, 1966, which discloses a soil sampling device employing a hollow cylindrical drum, hollow soil probes arranged to deposit cores of soil inside the drum and an access door in one end wall of the drum through which the collected soil is removed.

SUMMARY OF THE INVENTION

Broadly, the invention provides a rotatable member rotatably supported on a frame and having an internal chamber, an access door on the rotatable member opening into the internal chamber, latch means on the rotatable member and on the door including an element movable between a latching position for releasably holding the door in the closed position and an unlatching position for permitting the door to be opened to afford access to the internal chamber, and combined locking and unlatching means on the frame and operable for selectively preventing rotation of the rotatable member relative to the frame and for selectively moving the element to the unlatching position.

The invention also provides a soil aerating device including a frame, a hollow cylindrical drum rotatably supported from the frame for rolling travel over the surface of the ground or turf to be aerated and having substantially closed, opposed end walls, a peripheral wall extending between the end walls to define an internal chamber, and a door forming a portion of the peripheral wall, and a plurality of circumferentially spaced core-forming elements or tines mounted on the exterior of the peripheral wall and communicating with the internal chamber for removing plugs or cores from the ground or turf and depositing same in the internal chamber as the drum is rolled over the surface of the ground or turf. The door is releasably held in the closed position by latch means on the drum and on the door including an element which is movable between a latching position and an unlatching position to permit the door to be opened for removal of cores from the internal chamber. A combined drum locking and door unlatching means is provided on the frame for selectively preventing rotation of the drum relative to the frame and for selectively moving the element to the unlatching position.

In one embodiment, the latching means includes at least one locking pin on the interior of the door and the element comprises a shaft member mounted on the drum for rotation about an axis parallel to the drum axis and having, one one end, a driven connector which is accessible from the exterior of one of the drum end walls and a latch arm having a notch for receiving the locking pin when the door is closed and mounted on the shaft member for common rotation therewith, and means for biasing the latch arm toward the latching position.

In one embodiment, the combined drum locking and door unlatching means includes a drive member having a rod with a drive connector on the inner end thereof. The drive member is mounted on the frame for rotation about a fixed axis in parallel relation to the drum axis and for axial movement relative to the drum between a retracted position and an extended position wherein the drive connector can be connected with the driven connector on the shaft member. After this connection, the latch arm can be moved to the unlatching position by rotating the rod and the drum is prevented from rotating relative to the frame.

In one embodiment, the frame is movable between a raised position wherein the drum is disengaged from the ground or turf and a lowered or aerating position wherein the drum is in engagement with the ground or turf and the drive member is located relative to the rotational path of the shaft member such that, when the frame is in the raised position and the drive member is drivingly connected to the shaft member, the drum is situated in a rotational position wherein the door can fall by gravity to an open position upon rotation of the drive member rod to move the latch arm to the unlatching position.

A principal feature of the invention is the provision of a soil aerating device including a rotatable member or drum and the means for facilitating removal of plugs or cores collected inside the rotatable member or drum.

Another principal feature of the invention is the provision of a soil aerating device including a frame carrying a rotatable member or drum having substantially closed, opposed end walls, a peripheral wall extending between the end walls and carrying a plurality of core-forming elements and a door opening into the interior of the rotatable member or drum, latch means on the drum and on the door for releasably retaining the door in the closed position and including an element movable between latching and unlatching positions, and means for selectively preventing rotation of the drum relative to the frame and for selectively moving the element to an unlatching position to permit opening of the door.

A further principal feature of the invention is the provision of a soil aerating device described in the preceding paragraph wherein the door forms a portion of the peripheral wall of the drum, the frame is movable between a raised position wherein the drum is disengaged from the ground or turf and a lowered or aerating position wherein the drum is in engagement with the ground, and the last-mentioned means is located relative to the rotational path of the drum such that, when the frame is in the raised position and such means is operably connected to the latch means, the drum is situated in a rotational position wherein the door can fall by gravity to an open position upon moving the element to the unlatching position.

Other features and advantages of the embodiments of the invention will become apparent to those skilled in the art upon reviewing the following detailed description, the drawings and the appended claims.

BRIEF DESCRIPTION OF THE DRAWINGS

FIG. 1 is a side elevational view of a soil-aerating device embodying various of the features of the invention with the device shown hitched to the rear of a utility vehicle and the core-forming unit shown in the raised position.

FIG. 2 is an enlarged fragmentary end view of the drum in the device of FIG. 1 with the trap door shown in the closed position.

FIG. 3 is an enlarged fragmentary end view of the drum shown with the trap door shown in an open position.

FIG. 4 is an enlarged, partially sectioned rear elevation view of the drum and the drive member for locking the drum against rotation and unlatching the trap door with the drive member shown in the retracted position and the trap door shown in the closed position.

FIG. 5 is a view similar to FIG. 4 with the drive member shown in the extended position and the trap door shown in an open position.

Before explaining at least one embodiment of the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

DESCRIPTION OF THE PREFERRED EMBODIMENTS

Illustrated in the drawings is a soil aerating device 10 embodying various of the features of the invention and adapted for connection to a towing vehicle 12 (shown fragmentarily), such as a utility cart of the type commonly used around golf courses and the like.

The soil aerating device 10 includes a frame 14 which is hitched to the vehicle draw bar 16 and rotatably supports a core-forming unit 18 adapted to remove plugs or cores of earth and soil from a turf 20, e.g., a golf fairway, tee or green, as the device is towed along the surface of the turf 20. While various arrangements can be used, in the specific construction illustrated, the frame 14 and the coreforming unit 18 are arranged generally in the manner described in co-pending U.S. application Ser. No. 789,799 filed Apr. 22, 1977 and assigned to the assignee of the present application. The construction and operation of the frame 14 and the core-forming unit 18 will be briefly summarized and reference can be made to the above-identified application for a more detailed description.

The frame 14 includes a rear frame 22 having a pair of laterally spaced side members 24 (one shown) which incline upwardly and rearwardly and a forward frame 26 having a pair of laterally spaced side members 28 (one shown) which incline upwardly and forwardly. The lower or forward end of each of the rear frame side members 24 is pivotally connected at 30 to the lower or rear end of the respective forward frame side member 28 for limited pivotal movement of the rear frame 22 relative to the forward frame 26.

The core-forming unit 18 includes a ground-engagable rotatable member or cylindrical drum 32 which is carried on a horizontally extending shaft or axle 34 suitably journaled at its opposite ends in the rear frame side members 24. The drum 32 is hollow and has substantially closed, generally circular, opposed end walls 36 and 37 and a peripheral wall extending between the end walls 36 and 37 to define an interior or internal chamber. As best shown in FIGS. 3 and 4, a portion of the peripheral wall 38 is formed by a trap door 40 which, at one side, is pivotally mounted on the drum 32, such as by a hinge 41, for pivotal movement about an axis parallel to the drum axis.

Mounted on the exterior surface of the peripheral wall 38, including the trap door 40, and extending radially outwardly therefrom are a plurality of hollow coreforming elements or tines 42 which are arranged to cut through the grass and thatch, penetrate the sub-soil, and remove plugs or cores of grass and soil as the drum 32 is rolled over the surface of the turf 20.

Each of the tines is mounted in registry with a port 44 (FIGS. 4 and 5) provided in the peripheral wall 38 so that the cores removed from the turf 20 drop into and are collected in the interior of the drum 32. The tines 42 preferably are arranged in a plurality of laterally spaced, generally parallel rows with the tines in each row being circumferentially spaced at equal intervals, the tines in one row being staggered with respect to the tines in adjacent rows, and the tines in alternate rows being generally laterally aligned in parallel relationship to the rotational axis of the drum 32.

The forward portion of the forward frame 26 is pivotally connected at 46 to the vehicle draw bar 16. The forward and rear frames 26 and 22 are selectively moved, by a hydraulically actuated ram 48 connected between the vehicle and an arm 50 on the forward frame 26, between a raised position shown in FIG. 1 wherein the core-forming unit is completely disengaged from the turf 20 and a lowered or aerating position wherein the drum 32 engages the turf and the tines 42 can penetrate the turf.

After a quantity of cores have been collected in the interior of the drum 32, the core-forming unit 18 can be raised by operating the ram 48, the device moved to a location where the cores are to be disposed, and the trap door 40 opened to dump the cores from the interior of the drum 32.

Latch means are provided for releasably retaining the trap door 40 in the closed position. While various arrangements can be used, in the specific construction illustrated, such latch means (FIGS. 4 and 5) include a pair of axially extending locking pins 50 which are mounted on the interior of the trap door 40 at the opposite ends thereof. The locking pins 50 extend in parallel relation to the drum axis and each has an outer end portion 52 which projects axially outwardly beyond the respective drum end walls 36 and 37.

Pivotally mounted on the drum 32 eaxteriorly of the end walls 36 and 37 is a pair of latch elements or arms 54, each having a notch 56 for receiving the outer end portion 52 of a respective locking pin 50 when the trap door is closed and a camming surface 57 extending from the notch 56. Each of the latch arms 54 is movable between a latching position shown in FIG. 2 wherein the notch 56 engages the locking pin 50 to releasably retain the trap door 40 in the closed position and an unlatching position shown in FIG. 3 wherein the locking pins 50 are disengaged from the latch arm notches 56 to permit the trap door 40 to be opened.

More specifically, the latch arms 54 are fixedly mounted on the opposite ends of the tubular shaft member 58 which extends through the drum 32 in parallel relation to the drum axis and is suitably rotatably supported or journaled in the drum end walls 36 and 37. The latch arms 54 are biased into engagement with the latching pins 50 to retain the trap door 40 in the closed position by a spring 60 connected between one of the latch arms 54 and the respective end wall 36.

A combined drum locking and door unlatching means is provided for selectively preventing rotation of the drum 32 relative to the frame 14 when the trap door 40 is to be opened or any other time non-rotation of the drum is desired, and for selectively moving the latching arms 54 to the unlatching position. In the specific construction illustrated, the combined drum locking and door opening means includes a drive member 61 having a shaft or a rod 62 which is axially alignable with the shaft member 38, a handle 64 on the outer end of the rod 62, and a cross pin 66 on the inner end of the rod 62. The combined drum locking and door unlatching means further includes a slotted opening 68 provided in one of the outer ends of the shaft member 58 for receiving the inner end of the drive member rod 62 and the cross pin 66.

The drive member 61 is mounted on a bracket 70 extending from a rear frame side member 24 for rotation about a fixed axis parallel to the drum axis and for axial movement relative to the drum end wall 36 between a retracted position shown in FIG. 4 wherein the inner end of the drive member rod 62 is spaced from the drum end wall 36 and the drum 32 is free to rotate and an extended position shown in FIG. 5 wherein the inner end of the drive member rod 62 and the cross pin 66 are inserted into the slotted opening 68 on the outer end of the shaft member 58. When the inner end of the drive member rod 62 is inserted into the slotted opening 68 in the shaft member 58, the drive member 61 cooperates with the shaft member 58 to prevent rotation of the drum 32. Also, rotation of the drive member handle 64 in the clockwise direction as viewed in FIGS. 3 and 4 pivots the latch arms 54 to the unlatching position. Thus, the cross pin 66 on the drive member 61 serves as a drive connector and the slotted opening 68 on the shaft member 58 serves as a driven connector for moving the latch arms 54 to the unlatching position in response to rotation of the drive member rod 62.

To facilitate dumping of plugs or cores from the drum 32, the drive member 61 preferably is located relative to the rotational path of the outer end of the shaft member 58 such that, when the drum 32 is in the raised position shown in FIG. 1 and the drive member 61 is drivingly connected to the shaft member 58 (i.e., the inner end of the drive member rod 62 is inserted into the slotted opening 68), the drum 32 is situated in a rotational position wherein the trap door 40 falls by gravity to the open position upon movement of the latch arm 54 to the unlatching position as shown in FIG. 3.

Means are provided for releasably holding the drive member 61 in the retracted and extended positions. While various arrangements can be used, in the specific construction illustrated, such means include a pair of axially spaced annular recesses 72 and 74 in the drive member rod 62 and a plug 76 threaded into the bracket 70 and carrying a detent ball 78 which is spring biased towards the drive member rod 62 for releasable engagement with the recesses 72 and 74 when the drive member 61 is respectively in the retracted position and in the extended position.

Provided on the trap door 40 to facilitate opening and closing thereof is an axially extending handle 80 including a handgrip portion 82 which extends axially outwardly beyond the drum end wall 36. Trap door 40 can be slammed closed by grasping and lifting on the handgrip portion 82 of the handle 80 to move the lock pins 50 into engagement with the camming surfaces 57 on the latch arms 54, whereupon further lifting causes the latch arms 54 to pivot in a clockwise direction against the biasing force of the spring 60 and the lock pins 50 are received in respective latch arm notches 56. A hand guard 84 is provided on the outer end of the handle 80 adjacent the handgrip portion 82 to prevent the operator from placing his hand close enough to the drum side wall 36 to be pinched between the trap door 40 and the drum 32 when the trap door 40 is slammed closed.

As best shown in FIGS. 3 and 4, a notch 86 is provided in each of the drum end walls 36 and 37 for accommodating the outer end portion 52 of the respective lock pin 50 and a notch 88 is provided in the drum end wall 36 for accommodating the outer end portion of the handle 80.

While the construction illustrated includes two latch arms 54 mounted exteriorly of the drum end walls 36 and 37, the latch arms 54 can be situated inside the drum 32 and a single latch arm 54 may be adequate for some applications. Also, the shaft member 58 can extend wholly inside the drum 32 with the slotted opening 68 located interiorly of the drum end wall 36 so long as it is accessible for connection with the inner end of the drive member rod 62.

Various of the features of the invention are set forth in the following claims:

What is claimed is:

1. A soil aerating device comprising a frame, a rotatable member having an internal chamber and rotatably supported from said frame for rolling travel along the surface of the ground or turf to be aerated, at least one core-forming element mounted on said rotatable member and communicating with said internal chamber for removing cores from the ground or turf and depositing same in said internal chamber as said rotatable member rolls over the surface of the ground or turf, a door on said rotatable member opening into said internal chamber, latch means on said rotatable member and on said door including an element movable between a latching position for releasably retaining said door in the closed position and an unlatching position for permitting said door to be opened for removal of cores from said internal chamber, and combined locking and unlatching means on said frame for selectively preventing rotation of said rotatable member relative to said frame and for selectively moving said element to the unlatching position.

2. A soil aerating device according to claim 1 wherein said latch means includes pin means on one of said door and said rotatable member, and wherein said element comprises a latch arm mounted on the other of said door and said drum and having a notch for receiving said pin means when said door is in the closed position, said latch arm being movable between the latching position wherein said notch engages said pin to releasably retain said door in the closed position and an unlatching position wherein said notch is disengaged from said pin to permit opening of said door, and means for biasing said latch arm towards the latching position.

3. A soil aerating device according to claim 2 wherein said latch arm is mounted on said rotatable member for pivotal movement between the latching and unlatching positions and includes a driven connector operable for pivoting said latch arm from the latching position to the unlatching position and wherein said locking and unlatching means includes a drive member mounted on said frame for rotation about a fixed axis and for axial movement between a retracted position spaced from said rotatable member and an extended position wherein said drive member is drivingly engageable with said latch arm driven connector, after which engagement said latch arm can be pivoted to the unlatching position by rotating said drive member and said drive member cooperates with said latch arm drive connector to prevent rotation of said rotatable member relative to said frame.

4. A soil aerating device according to claim 3 wherein said rotatable member is a cylindrical drum having substantially closed, opposed end walls and a peripheral wall extending between said end walls and carrying said core-forming element, wherein said door forms a part of said peripheral wall and extends between said end walls, wherein said pin means is carried by said door, and wherein said latch arm is mounted on a shaft pivotally mounted on said drum and including said driven connector.

5. A soil aerating device comprising a frame, a hollow cylindrical drum rotatably supported from said frame for rolling travel over the surface of the ground or turf to be aerated, said drum having substantially closed, opposed end walls and a peripheral wall extending between said end walls to define an internal chamber, a portion of said peripheral wall being formed by a door hinged on an axis parallel to the rotational axis of said drum, a plurality of circumferentially spaced core-forming elements mounted on the exterior of said peripheral wall and communicating with said internal chamber for removing cores from the ground or turf and depositing same in said internal chamber as said drum is rolled over the surface of the ground or turf, latch means on said drum and on said door including an element movable between a latching position for releasably retaining said door in the closed position and an unlatching position for permitting said door to be opened for removal of cores from said internal chamber, and combined drum locking and door unlatching means on said frame for selectively preventing rotation of said drum relative to said frame and for selectively moving said element to the unlatching position.

6. A soil aerating device according to claim 5 wherein said latch means includes a locking pin on the interior of said door extending in parallel relationship to the drum axis, and wherein said element comprises a shaft member mounted on said drum for rotation about an axis parallel to the drum axis and having on one end thereof a driven connector which is accessible from the exterior of one of said drum end walls, a latch arm having a notch for receiving said locking pin when said door is in the closed position and mounted on said shaft for common rotational movement therewith between the latching position wherein said notch engages said locking pin to releasably retain said door in the closed position and the unlatching position wherein said notch is disengaged from said locking pin to permit said door to be opened, and means for biasing said latch arm towards the latching position.

7. A soil aerating device according to claim 6 wherein said drum locking and door unlatching means includes a drive member including a rod having a drive connector on the inner end thereof and mounted on said frame for rotation about a fixed axis in parallel relation to the drum axis and for axial movement relative to said one drum end wall between a retracted position wherein said drive connector is spaced axially outwardly from said one drum wall and an extended position wherein said drive connector is drivingly connectable with said driven connector on said shaft member, after which connection said latch arm can be moved to the unlatching position by rotating said rod and said drum is prevented from rotating relative to said frame.

8. A soil aerating device according to claim 7 wherein said frame is movable between a raised position wherein said drum is disengaged from the ground or turf and a lowered position wherein said drum is in engagement with the ground or turf, and wherein said drive member is located relative to the rotational path of said shaft member such that, when said frame is in the raised position and said drive member rod is drivingly connected to said shaft member, said drum is situated in a rotational position wherein said door can fall by gravity to an open position upon rotation of said rod to move said latch arm to the unlatching position.

9. A soil aerating device according to claim 7 wherein said shaft member extends through said drum with the opposite ends thereof journaled in and extending axially outwardly from said drum end walls, wherein one of said latch arms is mounted on each of the opposite ends of said shaft member exteriorly of the respective drum end wall, and wherein one of said locking pins is located on each of the opposite end portions of said door.

10. A soil aerating device according to claim 7 wherein said drive connector comprises a cross pin on the inner end of said rod, and wherein said driven connector comprises a slotted opening in the outer end portion of said shaft member for receiving said cross pin.

11. A soil aerating device according to claim 7 including means for releasably holding said drive member in the retracted and extended positions.

12. A device comprising a frame, a rotatable member rotatably supported from said frame and having an internal chamber, an access door on said rotatable member opening into said internal chamber, latch means on said rotatable member and on said door including an element movable between a latching position for releasably holding said door in the closed position and an unlatching position for permitting said door to be opened to afford access to said internal chamber, and combined locking and unlatching means on said frame operable for selectively preventing rotation of said rotatable member relative to said frame and for selectively moving said element to the unlatching position.

* * * * *